(12) United States Patent
Kobayashi et al.

(10) Patent No.: US 11,106,092 B2
(45) Date of Patent: Aug. 31, 2021

(54) ELECTRO-OPTICAL DEVICE COMPRISING AN INTER-SUBSTRATE CONDUCTIVE MEMBER DISPOSED SPACED APART FROM A SEAL MATERIAL AND ELECTRONIC APPARATUS

(71) Applicant: SEIKO EPSON CORPORATION, Tokyo (JP)

(72) Inventors: Kazu Kobayashi, Kai (JP); Takashi Shinohara, Chino (JP); Yuji Ikezaki, Chino (JP); Tomohito Kawa, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/906,414

(22) Filed: Jun. 19, 2020

(65) Prior Publication Data

US 2020/0400982 A1 Dec. 24, 2020

(30) Foreign Application Priority Data

Jun. 21, 2019 (JP) .............................. JP2019-115311

(51) Int. Cl.
*G02F 1/1339* (2006.01)
*G02F 1/1362* (2006.01)
*G02F 1/1333* (2006.01)

(52) U.S. Cl.
CPC ...... *G02F 1/1339* (2013.01); *G02F 1/136227* (2013.01); *G02F 1/133388* (2021.01)

(58) Field of Classification Search
CPC ........... G02F 2203/62; G02F 2201/501; G02F 2001/136218; G02F 2201/12; G02F 2001/133388
See application file for complete search history.

(56) References Cited

U.S. PATENT DOCUMENTS

| | | | | |
|---|---|---|---|---|
| 8,867,012 B2* | 10/2014 | Ogawa | ................. | G02F 1/1339 349/153 |
| 9,632,338 B2* | 4/2017 | Nishida | ............... | G02F 1/13306 |
| 2010/0084654 A1* | 4/2010 | Yamazaki | ......... | G02F 1/136204 257/43 |
| 2012/0113333 A1* | 5/2012 | Oba | .................... | G02F 1/13458 349/5 |
| 2016/0004109 A1 | 1/2016 | Shinohara et al. | | |
| 2017/0110806 A1* | 4/2017 | Igarashi | ............... | H01R 43/007 |
| 2017/0162531 A1* | 6/2017 | Ko | ............................. | C08J 5/18 |

FOREIGN PATENT DOCUMENTS

| | | |
|---|---|---|
| JP | 2016-014757 A | 1/2016 |
| JP | 2017-090482 A | 5/2017 |

\* cited by examiner

*Primary Examiner* — Paul C Lee
(74) *Attorney, Agent, or Firm* — Oliff PLC

(57) ABSTRACT

Provided are a pair of substrates, a seal material disposed between the pair of substrates, an inter-substrate conductive member disposed spaced apart from the seal material, and a moisture-proof film covering a side face of the seal material and a side face of the inter-substrate conductive member.

7 Claims, 5 Drawing Sheets

ELECTRO-OPTICAL DEVICE COMPRISING AN INTER-SUBSTRATE CONDUCTIVE MEMBER DISPOSED SPACED APART FROM A SEAL MATERIAL AND ELECTRONIC APPARATUS

The present application is based on, and claims priority from JP Application Serial Number 2019-115311, filed Jun. 21, 2019, the disclosure of which is hereby incorporated by reference herein in its entirety.

BACKGROUND

1. Technical Field

The present disclosure relates to an electro-optical device and an electronic apparatus.

2. Related Art

As an electro-optical device, a liquid crystal device used for a light valve of projector is known, for example. In the liquid crystal device, a seal material and an inter-substrate conductive member are disposed between a pair of substrates, and a liquid crystal layer is disposed within a space surrounded by the seal material. There is disclosed in JP 2017-90482 A, a structure in which a side face of a seal material is covered with an inorganic film in order to suppress the infiltration of moisture from the seal material into the liquid crystal layer.

Unfortunately, when the inter-substrate conductive member is in contact with the seal material, covering a side face of the contacting part with an inorganic film leads to breakage of the inorganic film due to the stress difference between the inter-substrate conductive member and the seal material, reducing moisture resistance between a pair of substrates.

SUMMARY

The electro-optical device of the present application includes a pair of substrates, a seal material disposed between the pair of substrates, an inter-substrate conductive member disposed spaced apart from the seal material, and an inorganic film covering a side face of the seal material and a side face of the inter-substrate conductive member.

In the above-described electro-optical device, the inorganic film may include any of hafnium oxide, tantalum oxide, and aluminum oxide.

The above-described electro-optical device may include four of the inter-substrate conductive members, wherein two or more of the inter-substrate conductive members of the four of the inter-substrate conductive members may be spaced apart from the seal material.

The above-described electro-optical device may include, at one of the pair of substrates, an interlayer insulating film having an opening, and an electrode provided along a side face of the opening and electrically coupled, inside the opening, to the inter-substrate conductive member, wherein the inter-substrate conductive member may be provided spaced apart from a part of the opening along a side face of the electrode, and the inorganic film may be provided to cover from a part of the opening along the side face of the electrode to the side face of the inter-substrate conductive member.

In the above-described electro-optical device, the inorganic film may cover between the seal material and the inter-substrate conductive member.

An electronic apparatus of the present application includes the above-described electro-optical device.

DESCRIPTION OF EXEMPLARY EMBODIMENTS

Embodiments of the present disclosure will be described below with reference to the accompanying drawings.

Configuration of Electro-Optical Device

Figure 1:
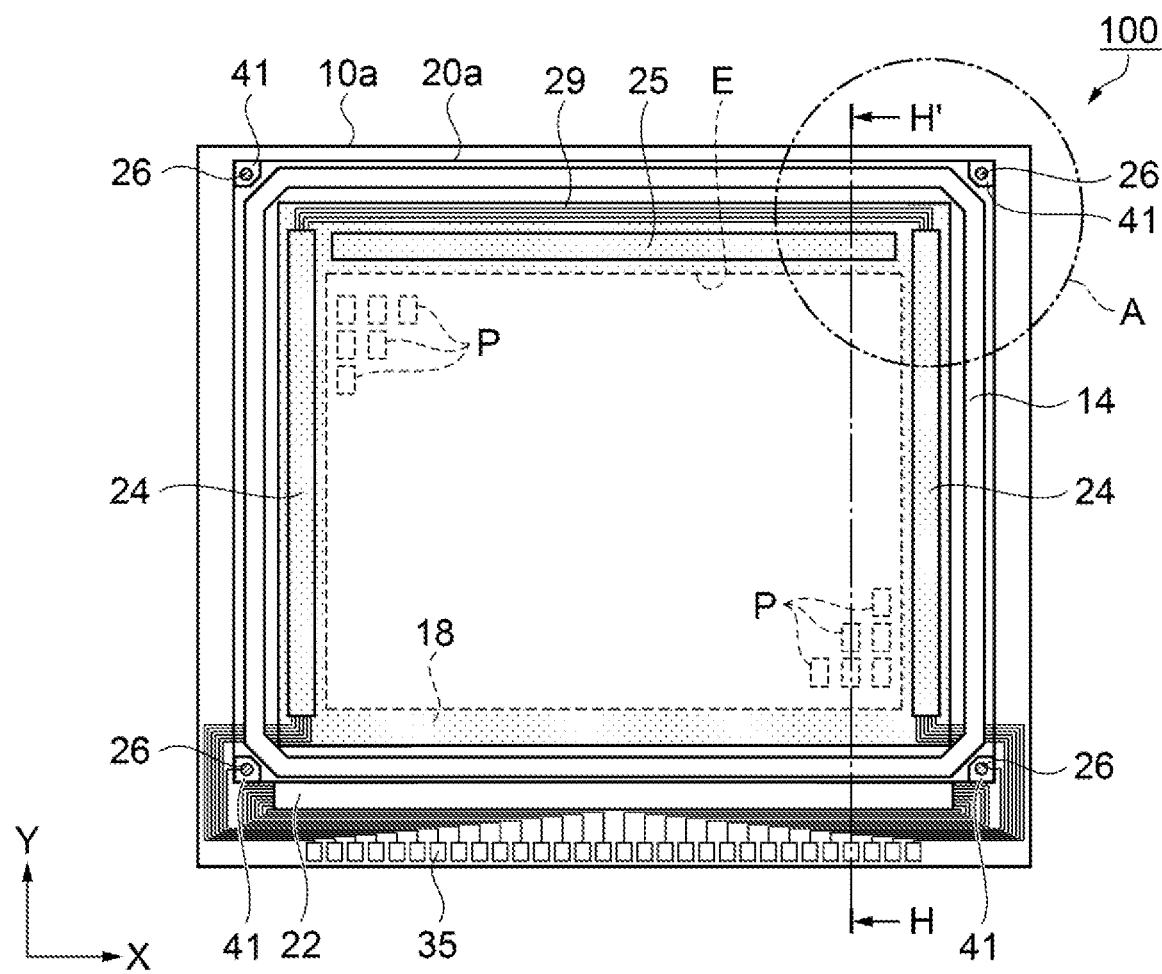
FIG. 1 is a plan view schematically illustrating a configuration of a liquid crystal device as an electro-optical device.
Figure 2:
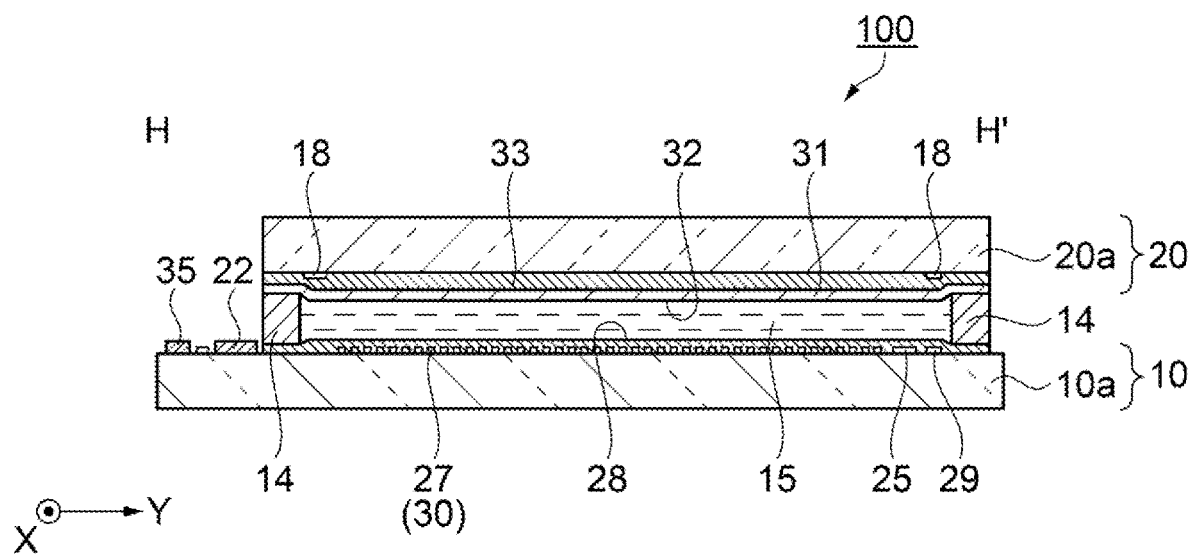
FIG. 2 is a cross-sectional view along line H-H' of a liquid crystal device illustrated in FIG. 1.

FIG. 1 is a plan view schematically illustrating a configuration of a liquid crystal device as an electro-optical device. FIG. 2 is a cross-sectional view along line H-H' of the liquid crystal device illustrated in FIG. 1. A configuration of the liquid crystal device will be described below with reference to FIGS. 1 and 2.

As illustrated in FIGS. 1 and 2, a liquid crystal device 100 of the embodiment includes an element substrate 10 and a counter substrate 20 as a pair of substrates disposed to face each other, and a liquid crystal layer 15 interposed between the pair of substrates. A transparent substrate such as a glass substrate, a quartz substrate, or a silicon substrate, for example, is used for a first base material 10a constituting the element substrate 10, and a transparent substrate such as a glass substrate or a quartz substrate, for example, is used for a second base material 20a constituting the counter substrate 20.

The element substrate 10 has a size larger than that of the counter substrate 20, and both the substrates 10 and 20 are affixed together via a seal material 14 disposed along the outer edge of the counter substrate 20. A liquid crystal having positive or negative dielectric anisotropy is encapsulated, inside the seal material 14 provided in an annular shape in a plan view, between the element substrate 10 and the counter substrate 20, to form the liquid crystal layer 15. For the seal material 14, an adhesive such as a thermosetting or ultraviolet curable epoxy resin or the like is employed, for example, The seal material 14 is mixed with spacers (not illustrated) for maintaining the spacing between the pair of substrates constant.

A display region E in which a plurality of pixels P are arrayed is provided inside the inner edge of the seal material 14. The display region E may include dummy pixels arranged to surround the plurality of pixels P, in addition to the plurality of pixels P that contribute to display. In addition, although not illustrated in FIGS. 1 and 2, a light-shielding film (Black Matrix: BM), which divides each of the plurality of pixels P in a planar manner in the display region E, are provided at the counter substrate 20.

A data line drive circuit 22 is provided between the seal material 14 along one side portion of the element substrate 10 and the one side portion. An inspection circuit 25 is also provided between the seal material 14 along another side portion facing the one side portion and the display region E. Scan line drive circuits 24 are further provided between the seal material 14 along other side portions orthogonal to the one side portion and facing each other and the display region E. Between the seal material 14 along another side portion facing the one side portion and the inspection circuit 25, a plurality of wiring lines 29 that couple the two pieces of the scanning line drive circuits 102 are provided.

A light-shielding film 18 (partition portion) serving as a light-shielding member is provided between the seal material 14 disposed in an annular shape at the counter substrate 20. The light-shielding film 18 is formed of, for example, a light-shielding metal or metal compound, and the inside of the light-shielding film 18 forms the display region E containing the plurality of pixels P. Note that, although not illustrated in FIG. 1, a light-shielding film that divides each of the plurality of pixels P in a planar manner is provided in the display region E as well.

Wiring lines linked to the data line drive circuit 22 and the scanning line drive circuit 24 are coupled to the plurality of external coupling terminals 104 aligned along the one side portion. Hereinafter, description will be given on the premise that a direction along the one side portion is referred to as X direction, and a direction along other two side portions orthogonal to the one side portion and facing each other is referred to as Y direction.

As illustrated in FIG. 2, a pixel electrode 27 having translucency and a thin film transistor (hereinafter referred to as "TFT 30") that is a switching element, which are provided for each of the pixel P, a signal wiring line, and an inorganic alignment film 28 covering these components are formed on the surface, on the side of the liquid crystal layer 15, of the first base material 10a.

In addition, a light-shielding structure is employed, which prevents light from being incident on a semiconductor layer in the TFT 30 and from destabilizing the switching operation. The element substrate 10 in the present disclosure includes at least the pixel electrode 27, the TFT 30, and the inorganic alignment film 28.

On a surface, on the side of the liquid crystal layer 15, of the counter substrate 20, the light-shielding film 18, an insulating film 33 formed to cover the light-shielding film 18, a counter electrode 31 provided to cover the insulating film 33, and an inorganic alignment film 32 that covers the counter electrode 31 are provided. The counter substrate 20 of the present disclosure includes at least the insulating film 33, the counter electrode 31, and the inorganic alignment film 32.

As illustrated in FIG. 1, the light-shielding film 18 is provided at a position surrounding the display region E and planarly overlapping the scanning line drive circuit 24 and the inspection circuit 25. This allows the light-shielding film 18 to block light incident from the side of the counter substrate 20 on peripheral circuits including these drive circuits and to serve a role of preventing malfunction of the peripheral circuits due to the light. The light-shielding film 18 also blocks light to prevent unnecessary stray light from being incident on the display region E, ensuring high contrast at the display of the display region E.

The insulating film 33, which is formed of, for example, an inorganic material such as a silicon oxide, is provided, having light-transitivity, to cover the light-shielding film 18. The insulating film 33 thus configured may be formed by film formation method using, for example, plasma Chemical Vapor Deposit (CVD) method or the like.

The counter electrode 31, which is formed of a transparent conductive film such as an Indium Tin Oxide (ITO), for example, is formed to cover the insulating film 33. In addition, as illustrated in FIG. 1, inter-substrate conductive members 26 are disposed, at the four corners of the counter substrate 20, between the counter substrate 20 and the element substrate 10 to allow a pad electrode 41 as the electrode on the side of the element substrate 10 to be electrically coupled to the counter electrode 31 on the side of the counter substrate 20. In other words, the element substrate 10 and the counter substrate 20 are electrically coupled to each other by the four pieces of the inter-substrate conductive members 26.

The inorganic alignment film 28 covering the pixel electrode 27 and the inorganic alignment film 32 covering the counter electrode 31 are selected based on an optical design of the liquid crystal device 100. Examples of the inorganic alignment films 28 and 32 include an inorganic alignment film formed such that an inorganic material such as SiOx (silicon oxide) is film formed using a vapor phase growth method, and is then aligned substantially vertically with respect to liquid crystal molecules having negative dielectric anisotropy.

The liquid crystal device 100 thus configured is of a transmissive-type, where an optical design is employed such as a normally white mode in which the transmittance of the pixel P when voltage is not applied is greater than that when voltage is applied, or a normally black mode in which the transmittance of the pixel P when voltage is not applied is less than that when voltage is applied. A polarizing element is disposed to be used on each of the light incidence side and the light emission side in accordance with the optical design.

Figure 3:
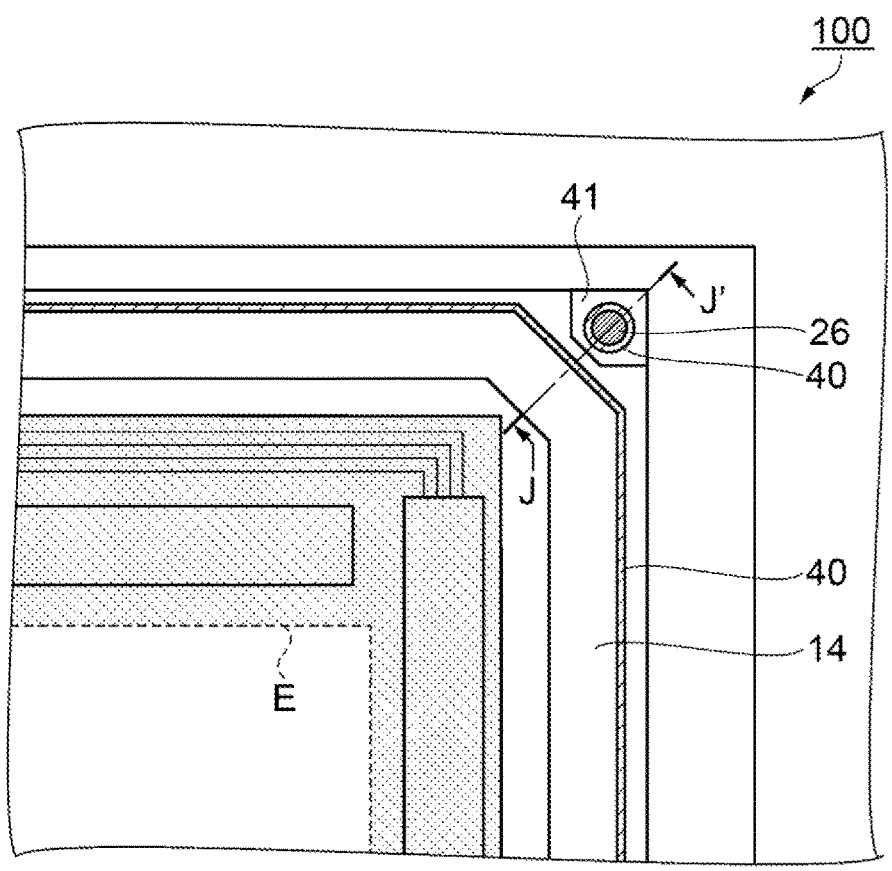
FIG. 3 is an enlarged view illustrating an enlarged portion A of a liquid crystal device illustrated in FIG. 1.
Figure 4:
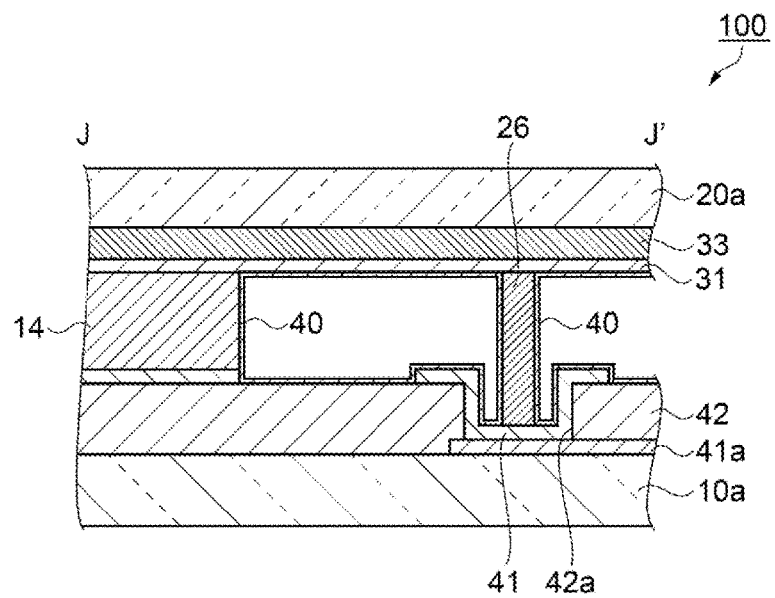
FIG. 4 is a schematic cross-sectional view along line J-J' of a liquid crystal device illustrated in FIG. 3.

FIG. 3 is an enlarged view illustrating an enlarged portion A of the liquid crystal device illustrated in FIG. 1. FIG. 4 is a schematic cross-sectional view along line J-J' of the liquid crystal device illustrated in FIG. 3. Hereinafter, a structure of the liquid crystal device, which is mainly the structure in the vicinity of the seal material and the inter-substrate conductive member, will be described with reference to FIGS. 3 and 4.

As illustrated in FIG. 3, the light-shielding film 18 is disposed to surround the display region E containing the pixel electrodes 27 (see FIG. 1), and the seal material 14 is disposed to surround the light-shielding film 18. As described above, the inter-substrate conductive members 26 are arranged at the four corners of the liquid crystal device 100. The inter-substrate conductive member 26 is formed of a material containing silver, for example.

As illustrated in FIGS. 3 and 4, the seal material 14 and the inter-substrate conductive member 26 are arranged spaced apart with a predetermined spacing. A moisture-proof film 40 as an inorganic film is formed on a side face of the seal material 14. Similarly, the moisture-proof film 40 as an inorganic film is also formed on a side face of the inter-substrate conductive member 26.

Specifically, as illustrated in FIG. 4, the element substrate 10, which is one substrate, is provided with an interlayer insulating film 42 on the first base material 10a. The pad electrode 41, which is electrically coupled to the inter-substrate conductive member 26, is formed on the interlayer insulating film 42. Specifically, the pad electrode 41 forms a concave shape along a side face of an opening 42a provided through the interlayer insulating film 42. The pad electrode 41 includes, for example, an ITO. The pad electrode 41 is electrically coupled to a wiring line 41a to which a common potential is applied through the opening 42a and a non-illustrated relay layer.

The inter-substrate conductive member 26 is electrically coupled to the concave part in the pad electrode 41. Specifically, the inter-substrate conductive member 26 is disposed spaced apart from a side face of the concave part of the pad electrode 41 that reflects the cross-sectional shape of the opening 42a provided through the interlayer insulating film 42. The moisture-proof film 40 is provided to cover from the side face of the concave part to the side face of the inter-substrate conductive member 26. That is, the moisture-proof film 40 also covers a spaced apart portion between the seal material 14 and the inter-substrate conductive member 26.

On the other hand, the counter substrate 20 is provided with the counter electrode 31 over the second base material 20a with the insulating film 33 interposed in between. The seal material 14 is provided on the counter electrode 31 between the inter-substrate conductive member 26 and the liquid crystal layer 15. The pad electrode 41 is electrically coupled to the counter electrode 31 via the inter-substrate conductive member 26 to allow the element substrate 10 to be electrically coupled to the counter substrate 20.

The moisture-proof film 40 is provided on the surface, on the side of the liquid crystal layer 15, of the element substrate 10 and on the surface, on the side of the liquid crystal layer 15, of the counter substrate 20. The moisture-proof film 40 is at least provided at the side face of the seal material 14 and the side face of the inter-substrate conductive member 26. This makes it possible to suppress the infiltration of moisture into the liquid crystal layer 15 through the seal material 14. This also makes it possible to suppress the inter-substrate conductive member 26 from being corroded.

The moisture-proof film 40 is a film formed by the method of atomic layer deposition (ALD) technology. The ALD technology is a technology for forming a significantly uniform and highly coatable thin film formed such that a gaseous raw material is delivered to a film formation surface to generate cores from the part adhering to the film formation surface, to form a film.

Examples of the material of the moisture-proof film 40 include inorganic metal element and oxide film of the inorganic metal element, for example. The material is, specifically, hafnium oxide ($HfO_2$), tantalum oxide ($Ta_2O_5$), and may also be aluminum oxide ($Al_2O_3$) or silica ($SiO_2$). In addition, a film containing other materials can be exemplified, where examples of the other materials include tantalum (Ta), oxygen (O), nitrogen (N), and carbon (C).

The seal material 14, which is a film containing a hydroxyl group (OH), includes, for example, epoxy resin, polyester, polyether, phenolic resin, acrylic resin, or the like. A use of a material containing a hydroxyl group allows the gaseous raw material to be selectively absorbed to the seal material 14, causing the reaction of ALD to proceed.

The seal material 14 is 2800 nm in height, for example. The moisture-proof film 40, which is, for example, in a range from 10 nm to 40 nm in thickness, is formed to have a substantially uniform thickness. The inter-substrate conductive member 26 is 3400 nm in height, for example.

Comparison of Amount of Infiltrating Moisture

Figure 5:
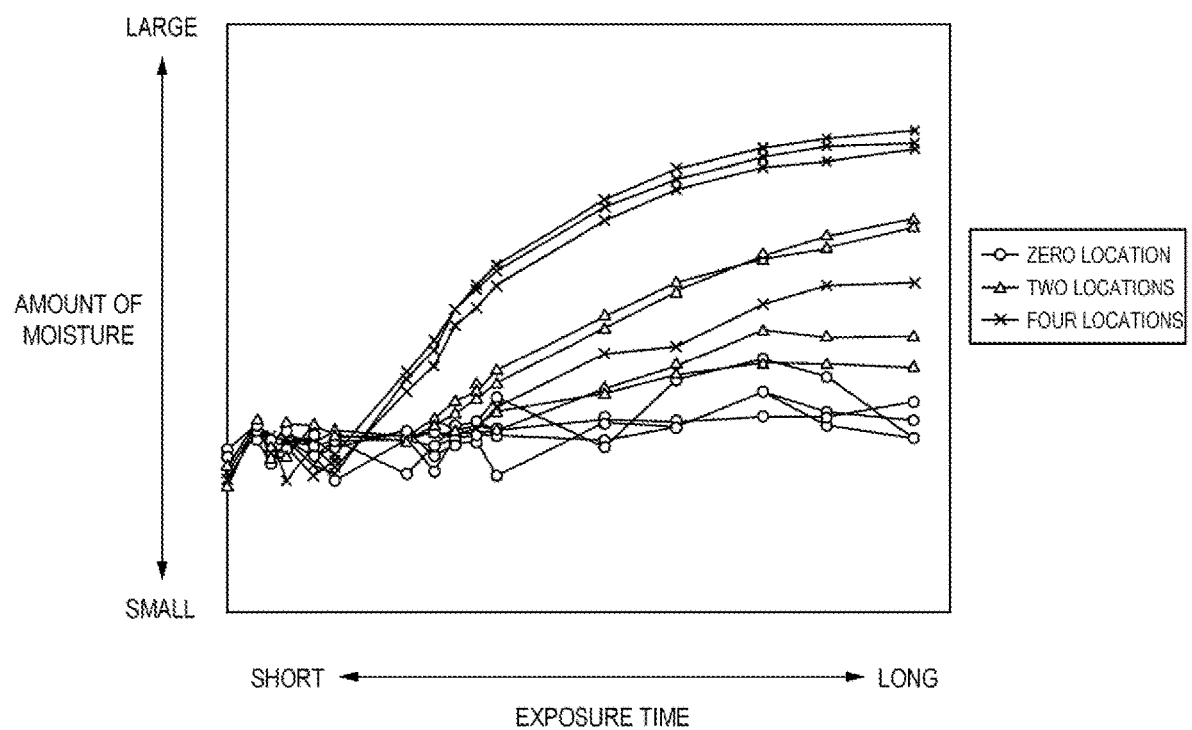
FIG. 5 is a graph illustrating a relationship between an amount of moisture infiltrating into a liquid crystal layer and an elapsed time.

FIG. 5 is a graph illustrating a relationship between the amount of moisture infiltrating into the liquid crystal layer and the elapsed time. The relationship between the amount of moisture and the elapsed time will be described below with reference to FIG. 5.

In the graph illustrated in FIG. 5, the amount of infiltrating moisture is marked by ○ (good) when all of the four pieces of the inter-substrate conductive members 26 are disposed spaced apart from the seal material 14 (see FIG. 1), the amount of infiltrating moisture is marked by Δ (acceptable) when the two of the four pieces of the inter-substrate conductive members 26 are disposed spaced apart from the seal material 14 and the rest two pieces of the inter-substrate conductive members 26 are disposed to be brought into contact with the seal material 14, and the amount of infiltrating moisture is marked by x (not acceptable) when all of the four pieces of the inter-substrate conductive members 26 are disposed to be brought into contact with the seal material 14.

Specifically, the horizontal axis indicates the duration of time during which the liquid crystal device 100 is exposed under a high-temperature and high-humidity environment, where the exposure time increases as approaching rightward. The vertical axis indicates the amount of moisture infiltrating into the liquid crystal layer 15 of the liquid crystal device 100, where the amount of moisture increases as approaching upward.

As illustrated in FIG. 1, when all of the four pieces of the inter-substrate conductive members 26, which is indicated by the mark ○, are arranged spaced apart from the seal material 14, almost no infiltration of moisture from the seal material 14 into the liquid crystal layer 15 was observed without being influenced by the duration of time during which the liquid crystal device 100 is exposed under a high-temperature and high-humidity environment.

Further, when the two pieces of the four pieces of the inter-substrate conductive members 26 are brought into contact with the seal material 14 and the rest two pieces of the inter-substrate conductive members 26 are arranged spaced apart from the seal material 14, which is indicated by the mark A, almost no infiltration of moisture from the seal material 14 into the liquid crystal layer 15 was observed when the exposure time is short, however, as the exposure time increases, an infiltration of moisture from the seal material 14 into the liquid crystal layer 15 was observed.

In addition, when all of the four pieces of the inter-substrate conductive members 26 are in contact with the seal material 14, which is indicated by the mark x, almost no infiltration of moisture from the seal material 14 into the liquid crystal layer 15 was observed, however, as the exposure time increases, an infiltration of moisture from the seal material 14 into the liquid crystal layer 15 was eventually observed at the maximum value.

As such, it is preferred that the seal material 14 be spaced apart from the inter-substrate conductive member 26, and the moisture-proof film 40 be formed on the side face of the seal material 14 and the side face of the inter-substrate conductive member 26, which are spaced apart from each other. This makes it possible to suppress, when the moisture-proof film 40 is exposed under a high-temperature and high-humidity environment, the breakage of the moisture-proof film 40 and to suppress the occurrence of display failures such as corner spots and the like, for example.

It was also found that advantageous effects of the moisture-proof film 40 at the outside of the seal material 14 can be sufficiently exerted unless the seal material 14 is brought into contact with the inter-substrate conductive member 26. This makes it possible to enhance moisture resistance performance of the liquid crystal device 100.

Further, making the seal material 14 be in contact with the inter-substrate conductive member 26 at two locations of the four locations leads to exhibit some advantageous effects of suppressing moisture from infiltrating into the liquid crystal layer 15, which is not so much as the case where the seal material 14 has no contact with the inter-substrate conductive member 26, compared to the case where the seal material 14 are in contact with all of the inter-substrate conductive members 26. In this case, making the seal material 14 be in contact with the inter-substrate conductive member 26 at two locations makes it possible to dispose the inter-substrate conductive member 26 at the inner side by the degree of the contact, to thus reduce the size of the liquid crystal device 100. In addition, it is considered that, from the above results, advantageous effects can be more effectively achieved when the seal material 14 does not come into contact with the inter-substrate conductive member 26 at three locations than at two locations.

Configuration of Electronic Apparatus

Figure 6:
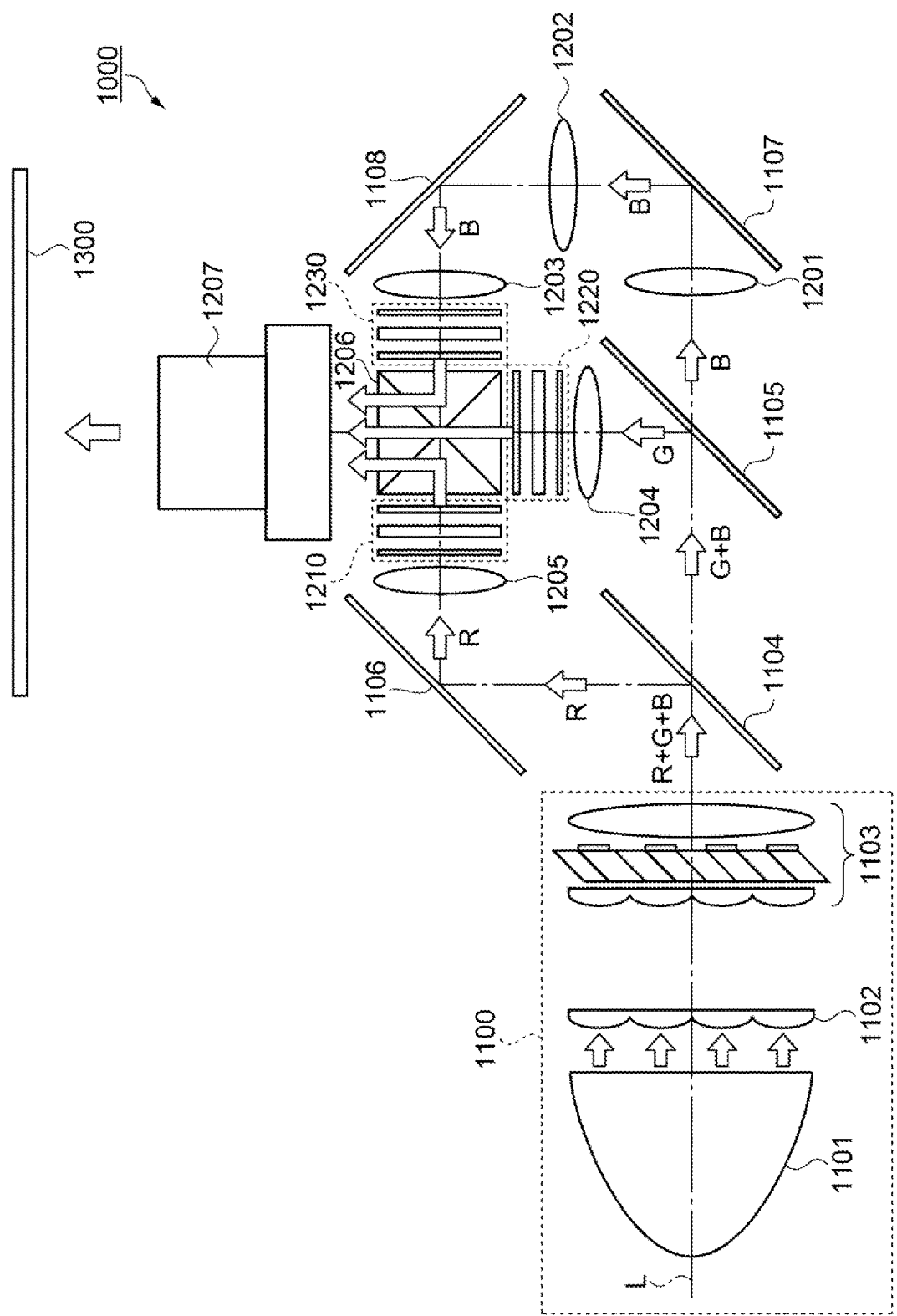
FIG. 6 is a diagram schematically illustrating a configuration of a projector as an electronic apparatus.

Next, a projector as an electronic apparatus provided with the above-described liquid crystal device will be described with reference to FIG. 6. FIG. 6 is a diagram schematically illustrating a configuration of the projector.

As illustrated in FIG. 6, a projector 1000 of the embodiment includes a polarized light illumination device 1100 disposed along a system optical axis L, two dichroic mirrors 1104 and 1105 as light separation elements, three reflection mirrors 1106, 1107, and 1108, five relay lenses 1201, 1202, 1203, 1204, and 1205, three liquid crystal light valves 1210, 1220, and 1230 of a transmissive type as optical modulation units, a cross dichroic prism 1206 as a photosynthesis element, and a projection lens 1207.

The polarized light illumination device 1100 generally includes a lamp unit 1101 being as a light source including a white light source such as an extra-high pressure mercury lamp or a halogen lamp, an integrator lens 1102, and a polarization conversion element 1103.

The dichroic mirror 1104 reflects the red light (R) of a polarized light flux exiting from the polarized light illumination device 1100 and transmits the green light (G) and the blue light (B). The other dichroic mirror 1105 reflects the green light (G) passing through the dichroic mirror 1104 and transmits the blue light (B).

The red light (R) reflected by the dichroic mirror 1104 is reflected by the reflection mirror 1106 and is then incident on the liquid crystal light valve 1210 through the relay lens 1205. The green light (G) reflected by the dichroic mirror 1105 is incident on the liquid crystal light valve 1220 through the relay lens 1204. The blue light (B) passing through the dichroic mirror 1105 is incident on the liquid crystal light valve 1230 through a light guide system including the three relay lenses 1201, 1202, and 1203 and the two reflection mirrors 1107 and 1108.

The liquid crystal light valves 1210, 1220, and 1230 are each disposed facing an incident surface for each type of color light of the cross dichroic prism 1206. The color light incident on the liquid crystal light valves 1210, 1220, and 1230 is modulated based on video information (video signal) and is emitted toward the cross dichroic prism 1206.

This prism includes four rectangular prisms bonded together, where on inner surfaces of the prisms, a dielectric multilayer film configured to reflect the red light and a dielectric multilayer film configured to reflect the blue light are formed in a cross shape. Three types of color light are synthesized by these dielectric multilayer films, to thus synthesize light representing a color image. The synthesized light is projected onto a screen 1300 by the projection lens 1207 being a projection optical system, to thus cause an image to be displayed in an enlarged manner.

The liquid crystal light valve 1210 is a valve to which the liquid crystal device 100 described above is applied. The liquid crystal device 100 is disposed with a gap between a pair of light-polarizing elements disposed in a crossed-Nicols state at an incident side and an emission side of the color light. The same applies to the other liquid crystal light valves 1220 and 1230.

The projector 1000 thus configured, in which the liquid crystal light valves 1210, 1220, and 1230 are used, can achieve high reliability.

Note that examples of the electronic apparatus on which the liquid crystal device 100 is installed and used include, in addition to the projector 1000, various electronic apparatuses such as a head-up display (HUD), a head-mounted display (HMD), a smartphone, an Electrical View Finder (EVF), a mobile mini-projector, an electronic book, a mobile phone, a mobile computer, a digital camera, a digital video camera, a display, vehicle equipment, audio equipment, an exposure apparatus, and an illumination apparatus.

As described above, according to the liquid crystal device 100, and the electronic apparatus of the embodiment, the following advantageous effects can be achieved.

(1) According to the embodiment, the seal material 14 is disposed spaced apart from the inter-substrate conductive member 26, and each of these is covered with the moisture-proof film 40, thus making it possible to suppress the breakage of the moisture-proof film 40 due to the stress difference between the seal material 14 and the inter-substrate conductive member 26. This allows functions as the moisture-proof film 40 to be exerted, and to moisture resistance of the liquid crystal device 100 to be improved.

(2) According to the embodiment, the inclusion of the liquid crystal device 100 configured as described above enables to provide an electronic apparatus that can improve moisture resistance.

Modification Examples

Further, the above-described embodiment may be modified as follows.

Figure 7:
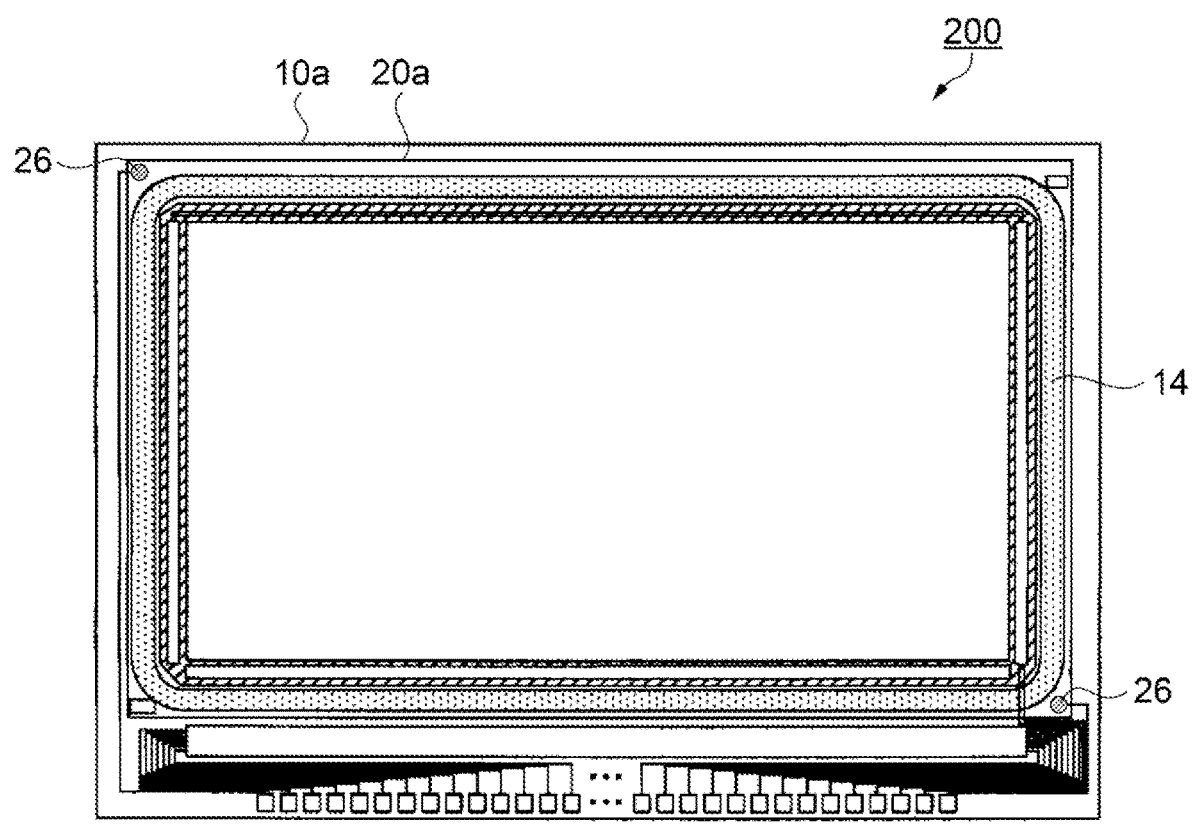
FIG. 7 is a plan view schematically illustrating a configuration of a modification example.

In the above-described embodiment, one piece of the inter-substrate conductive member 26 is disposed at each of the four corners of the liquid crystal device 100, however, the present disclosure, without being not limited to this embodiment, may be applied to a liquid crystal device such as that illustrated in FIG. 7. FIG. 7 is a plan view schematically illustrating a configuration of the liquid crystal device of a modification example. In a liquid crystal device 200 illustrated in FIG. 7, the inter-substrate conductive member 26 is disposed at two corners opposing to each other of the four corners.

Further, in the liquid crystal device 200 illustrated in FIG. 7, the inter-substrate conductive member 26 is disposed at two locations of the upper left corner and the lower right corner in a plan view, however, the inter-substrate conductive member 26 may be disposed, without being limited to this, only at two locations of the upper right corner and the lower left corner. Alternatively, the inter-substrate conductive member 26 may be disposed at two locations along one side of the counter substrate 20, specifically, only at two locations on both sides of the one side.

In the above-described embodiment, the liquid crystal device 100 is exemplified as the electro-optical device, however, the electro-optical device may be applied, without being limited to this, to an organic EL device, a plasma display, an electronic paper (EPD), or the like.

Contents derived from the embodiment will be described below.

The electro-optical device includes a pair of substrates, a seal material disposed between the pair of substrates, an inter-substrate conductive member disposed spaced apart from the seal material, and an inorganic film covering each of a side face of the seal material and a side face of the inter-substrate conductive member.

According to the above configuration, the seal material is disposed spaced apart from the inter-substrate conductive member, and each of these is covered with an inorganic film, thus making it possible to suppress the breakage of the moisture-proof film due to the stress difference between the seal material and the inter-substrate conductive member. Thus, the inorganic film can be utilized as a moisture-proof film, improving moisture resistance between the pair of substrates.

In the above-described electro-optical device, the inorganic film may be any one of hafnium oxide, tantalum oxide, and aluminum oxide.

According to the above configuration, a use of any one of the above-described materials as the inorganic film makes it possible to form a favorable inorganic film, and to improve moisture resistance.

The above-described electro-optical device may include four pieces of the inter-substrate conductive member, in which two or more pieces of the inter-substrate conductive members of the four pieces of the inter-substrate conductive member may be spaced apart from the seal material.

According to the above configuration, two or more pieces of the four pieces of the inter-substrate conductive members are spaced apart from the seal material, thus making it possible to cover, without being influenced by the stress difference, the side faces of at least two pieces of the inter-substrate conductive members with the inorganic film. This makes it possible to improve moisture resistance between the pair of substrates compared to a case where all of the four pieces of the inter-substrate conductive members are in contact with the seal material.

The above-described electro-optical device may include, at one substrate of the pair of substrates, an interlayer insulating film provided with an opening, and an electrode provided along a side face of the opening and electrically coupled, inside the opening, to the inter-substrate conductive member, in which the inter-substrate conductive member may be provided spaced apart from a part along a side face of the opening of the electrode, and in which the inorganic film may be provided to cover from a part of the electrode along the side face of the opening to the side face of the inter-substrate conductive member.

According to the above configuration, the inorganic film is provided from the side face of the electrode provided inside the opening to the side face of the inter-substrate conductive member spaced apart from the electrode, thus making it possible to suppress the breakage of the inorganic film due to the stress difference between the seal material and the inter-substrate conductive member.

In the above-described electro-optical device, the inorganic film may cover between the seal material and the inter-substrate conductive member.

According to the above configuration, covering the part between the seal material and the inter-substrate conductive member with an inorganic film, in other words, causing the seal material to be spaced apart from the inter-substrate conductive member and covering the side face of the seal material, the side face of the inter-substrate conductive member, and between the seal material and the inter-substrate conductive member with the inorganic film makes it possible to suppress the breakage of the inorganic film due to the stress differences between the seal material and the inter-substrate conductive member.

An electronic apparatus includes the above-described electro-optical device.

According to the above configuration, the inclusion of the electronic apparatus configured as described above enables to provide an electronic apparatus that can improve moisture resistance.

What is claimed is:

1. An electro-optical device comprising:
a pair of substrates;
a seal material disposed between the pair of substrates;
an inter-substrate conductive member disposed spaced apart from the seal material;
an inorganic film having a first portion disposed on a side face of the seal material and a second portion disposed on a side face of the inter-substrate conductive member, the side face of the seal material being a face that opposes the inter-substrate conductive member, the side face of the inter-substrate conductive member being a face that opposes the seal material, the side face of the seal material and the side face of the inter-substrate conductive member opposing each other, and the first portion and the second portion being spaced apart from each other;
at one of the pair of substrates, an interlayer insulating film having an opening; and
an electrode provided along a side face of the opening and electrically coupled, inside the opening, to the inter-substrate conductive member, wherein
the inter-substrate conductive member is provided spaced apart from a part of the electrode along a side face of the opening, and
the inorganic film is provided to cover from the part of the opening along the side face of the electrode to the side face of the inter-substrate conductive member.

2. The electro-optical device according to claim 1, further comprising:
a counter electrode disposed in the other of the pair of the substrates,
wherein the inorganic film has a third portion disposed on the interlayer insulating film and a fourth portion disposed on the counter electrode.

3. An electro-optical device comprising:
a pair of substrates;
a seal material disposed between the pair of substrates;
an inter-substrate conductive member disposed spaced apart from the seal material;
an inorganic film covering a side face of the seal material and a side face of the inter-substrate conductive member; and
at one of the pair of substrates, an interlayer insulating film having an opening, and an electrode provided along a side face of the opening and electrically coupled, inside the opening, to the inter-substrate conductive member, wherein
the inter-substrate conductive member is provided spaced apart from a part of the electrode along the side face of the opening, and
the inorganic film is provided to cover from the part of the electrode along the side face of the opening to the side face of the inter-substrate conductive member.

4. The electro-optical device according to claim 3, wherein the inorganic film includes any of hafnium oxide, tantalum oxide, and aluminum oxide.

5. The electro-optical device according to claim 3, comprising four of the inter-substrate conductive members, wherein
   two or more of the inter-substrate conductive members of the four of the inter-substrate conductive members are spaced apart from the seal material.

6. The electro-optical device according to claim 3, wherein the inorganic film covers between the seal material and the inter-substrate conductive member.

7. An electronic apparatus, comprising the electro-optical device according to claim 3.

* * * * *